United States Patent [19]
Fairchild et al.

[11] Patent Number: 5,884,924
[45] Date of Patent: Mar. 23, 1999

[54] WHEELBARROW

[75] Inventors: Robert A. Fairchild, Cameron Park; Denis R. Neimeyer, Loomis, both of Calif.

[73] Assignee: North American Innovations, Ltd., Sacramento, Calif.

[21] Appl. No.: 944,262

[22] Filed: Oct. 6, 1997

Related U.S. Application Data

[60] Provisional application No. 60/056,913 May 22, 1997.

[51] Int. Cl.$^6$ .................................................. B62B 1/00
[52] U.S. Cl. .................................. 280/47.31; 280/47.32; 280/47.33; 298/2
[58] Field of Search .............................. 280/47.31, 47.3, 280/47.32, 47.33, 47.2, 47.16, 47.315, 47.21, 79.2, 659; 298/2, 3, 17 B, 17 SG

[56] References Cited

U.S. PATENT DOCUMENTS

| | | | |
|---|---|---|---|
| 400,534 | 4/1889 | Annin | 280/47.31 |
| 795,592 | 7/1905 | Edick | 280/47.31 |
| 2,102,684 | 12/1937 | Dorward | 280/47.31 |
| 2,247,083 | 6/1941 | Garlinghouse | 280/47.31 |
| 2,422,331 | 6/1947 | Bates | 280/47.31 |
| 2,553,334 | 5/1951 | Schmidt | 280/47.31 |
| 5,026,079 | 6/1991 | Donze et al. | 280/47.31 |
| 5,067,737 | 11/1991 | Broeske | 280/47.31 |
| 5,087,061 | 2/1992 | Wallace | 280/47.31 X |
| 5,106,113 | 4/1992 | Piacentini | 280/47.21 |
| 5,601,298 | 2/1997 | Watanabe | 280/47.31 |

OTHER PUBLICATIONS

P. 7 of Kelley Mfg. Co. catalog, date unknown.

*Primary Examiner*—Robert J. Oberleitner
*Assistant Examiner*—Pamela J. Lipka
*Attorney, Agent, or Firm*—Philip L. Bateman

[57] ABSTRACT

A wheelbarrow contains a tray, a frame, two legs, two handles, two axle brackets, a wheel axle, and a wheel. The wheelbarrow also contains two spaced apart roll bars extending from the frame in a forward and downward direction to a point forward of the forward edge of the tray, then curving upward and extending vertically for a distance of at least about six inches. The upward curve of the roll bar is located below the wheel axle. The upward curve of the roll bar contacts the ground and forms a fulcrum when the wheelbarrow is raised at an angle of not greater than about 40° and so that the wheelbarrow will balance in a vertical resting position on the vertical extensions of the roll bars if the wheelbarrow is released after being raised at an angle of not greater than about 70°.

14 Claims, 2 Drawing Sheets

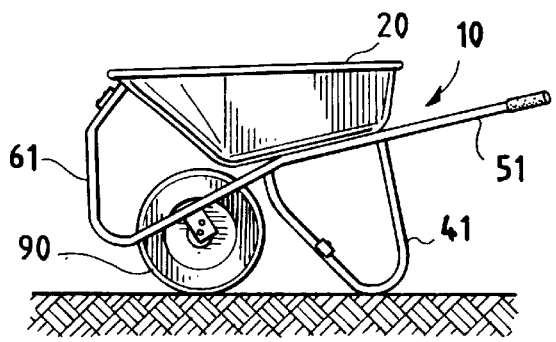
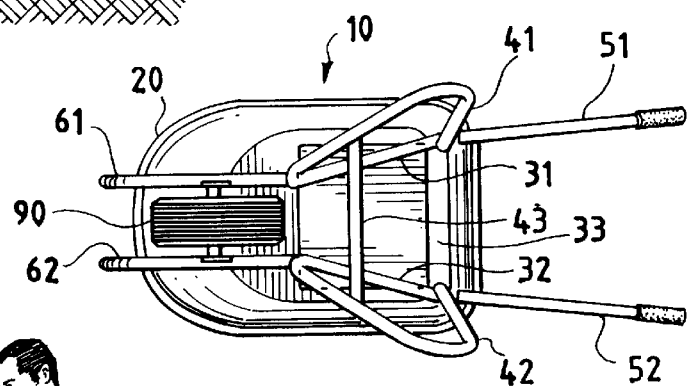
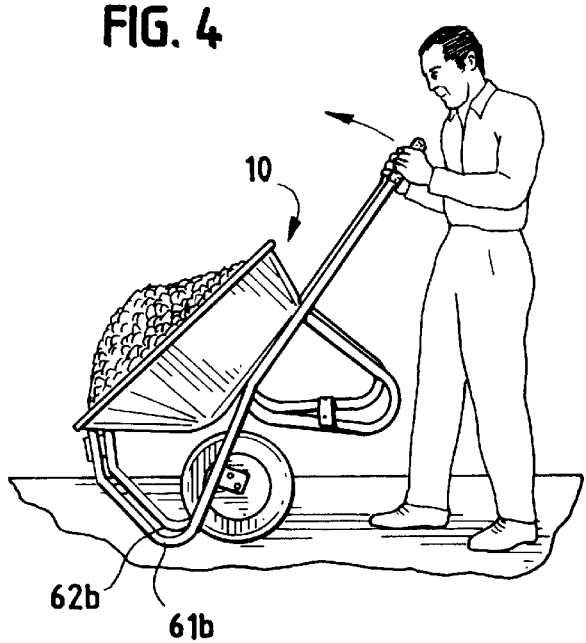
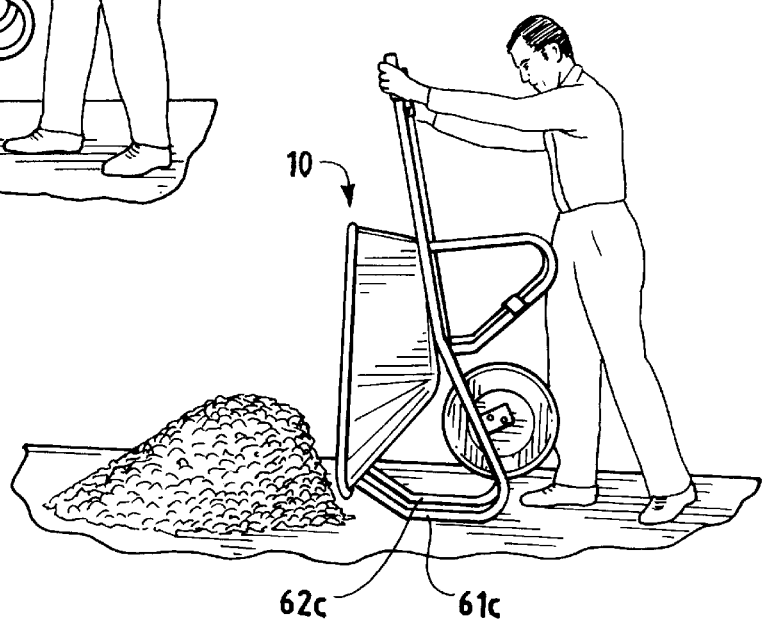

WHEELBARROW

CROSS-REFERENCE TO RELATED APPLICATION

This application claims the benefit of U.S. Provisional Application Ser. No. 60/056,913, filed May 22, 1997.

FIELD OF THE INVENTION

This invention relates to vehicles for transporting loads by hand. More particularly, this invention relates to wheelbarrows.

BACKGROUND OF THE INVENTION

A wheelbarrow is a device that is used to transport heavy loads by hand. A wheelbarrow consists of a tray mounted on a wheel and two legs with handles that extend to the rear. A wheelbarrow is moved by lifting its handles to raise the legs off the ground, balancing the loaded wheelbarrow on its wheel, and walking. A wheelbarrow is typically unloaded by dumping, i.e., lifting the handles to tip the tray into a vertical position where the load slides or pours out the sloped front end of the tray. A wheelbarrow is an example of a second-class lever in which the axle of the wheel forms the fulcrum and the handles form the effort arms.

Wheelbarrows are especially useful in moving loads across soft or uneven ground because the single wheel provides high maneuverability and also because the user can keep the load balanced by raising or lowering one or both of the handles. Wheelbarrows are also especially useful because of their ability to easily dump the load. However, as the weight of the load increases, it becomes more difficult to balance the wheelbarrow during movement and dumping. Dumping a heavy load is particularly difficult because the user must change from lifting the handles with an underhanded grip to pushing the handles with an overhanded grip while simultaneously balancing the wheelbarrow on a single wheel as the load rapidly shifts position. If the user loses balance of the wheelbarrow, the load is spilled at an undesired location and property damage and/or physical injury can occur.

Because of the difficulty in balancing a conventional wheelbarrow during dumping, many different modifications have been suggested. For example, Donze et al., U.S. Pat. No. 5,026,079, issued Jun. 25, 1991, discloses a wheelbarrow having multiple wheels and a horizontal abutment bar positioned in front of the wheels. The wheels are positioned in vertical alignment with the center of gravity of the tray so that the force required to lift the handles is minimized. The abutment bar is in horizontal alignment with the axles of the wheels and is in vertical alignment with the straight front edge of the tray. The abutment bar serves as a fulcrum for tipping the wheelbarrow and also enables the wheelbarrow to be balanced in a vertical storage position resting on the abutment bar and the straight front edge of the tray. The multiple wheels of the Donze et al. wheelbarrow provide improved stability during movement and dumping, but at the cost of decreased maneuverability and increased weight.

Broeske, U.S. Pat. No. 5,067,737, issued Nov. 26, 1991, discloses a wheelbarrow whose tray is in the form of a box having vertical side walls. The wheel is recessed into the bottom of the tray to provide a low center of gravity. However, the recessed wheel also reduces clearance, making the wheelbarrow unsuitable for use over uneven ground. When the Broeske wheelbarrow is tipped, the bottom front of the tray makes contact with the ground at an early point to form the fulcrum. However, the steep front of the tray requires the handles to be lifted well over vertical to empty the tray. Dumping rods are attached to the top front of the tray to raise the lid of the tray off the ground during dumping.

Several companies, including Kelley Manufacturing Company, sell a concrete cart having two large diameter wheels straddling the tray. When dumping, the cart tips forward on curved rocker arms. The concrete cart is not as maneuverable as a conventional wheelbarrow and has minimal ground clearance, making it suitable only for use on relatively flat and smooth ground.

Accordingly, a demand exists for a wheelbarrow that is as maneuverable as a conventional wheelbarrow, but is easier to dump and whose tray does not contact the ground during dumping.

SUMMARY OF THE INVENTION

The general object of this invention is to provide an improved wheelbarrow. More particular objects are to provide a wheelbarrow that is highly maneuverable, is easy to dump, stores compactly, and has a tray that does not contact the ground during dumping.

We have invented such an improved wheelbarrow. The wheelbarrow comprises: (a) a tray having a concave upper surface for carrying a load, a lower surface, and a forward edge; (b) a frame attached to the lower surface of the tray; (c) two legs depending from the frame for supporting the wheelbarrow in a horizontal resting position; (d) two handles extending from the frame in a rearward and upward direction for handling the wheelbarrow; (e) two spaced apart roll bars extending from the frame in a forward and downward direction to a point forward of the forward edge of the tray, then curving upward and extending vertically for a distance of at least about six inches; (f) an axle bracket attached to the forward and downward extension of each roll bar, each axle bracket having at least one hole, and each hole located above a horizontal line passing through the upward curve of the roll bar; (g) a wheel axle removably secured through the holes in the axle brackets; and (h) a wheel mounted on the wheel axle; so that the upward curve of the roll bar contacts the ground and forms a fulcrum when the wheelbarrow is raised at an angle of not greater than about 40° and so that the wheelbarrow balances in a vertical resting position on the vertical extensions of the roll bars when the wheelbarrow is raised at an angle of not greater than about 70°.

BRIEF DESCRIPTION OF THE DRAWINGS

FIG. 2 is a side elevation view of the wheelbarrow.

FIG. 3 is a bottom plan view of the wheelbarrow.

FIG. 4 is a perspective view of the wheelbarrow being lifted to a dumping position.

FIG. 5 is a perspective view of the wheelbarrow in a dumping/vertical resting position.

DETAILED DESCRIPTION OF THE INVENTION

Figure 1:
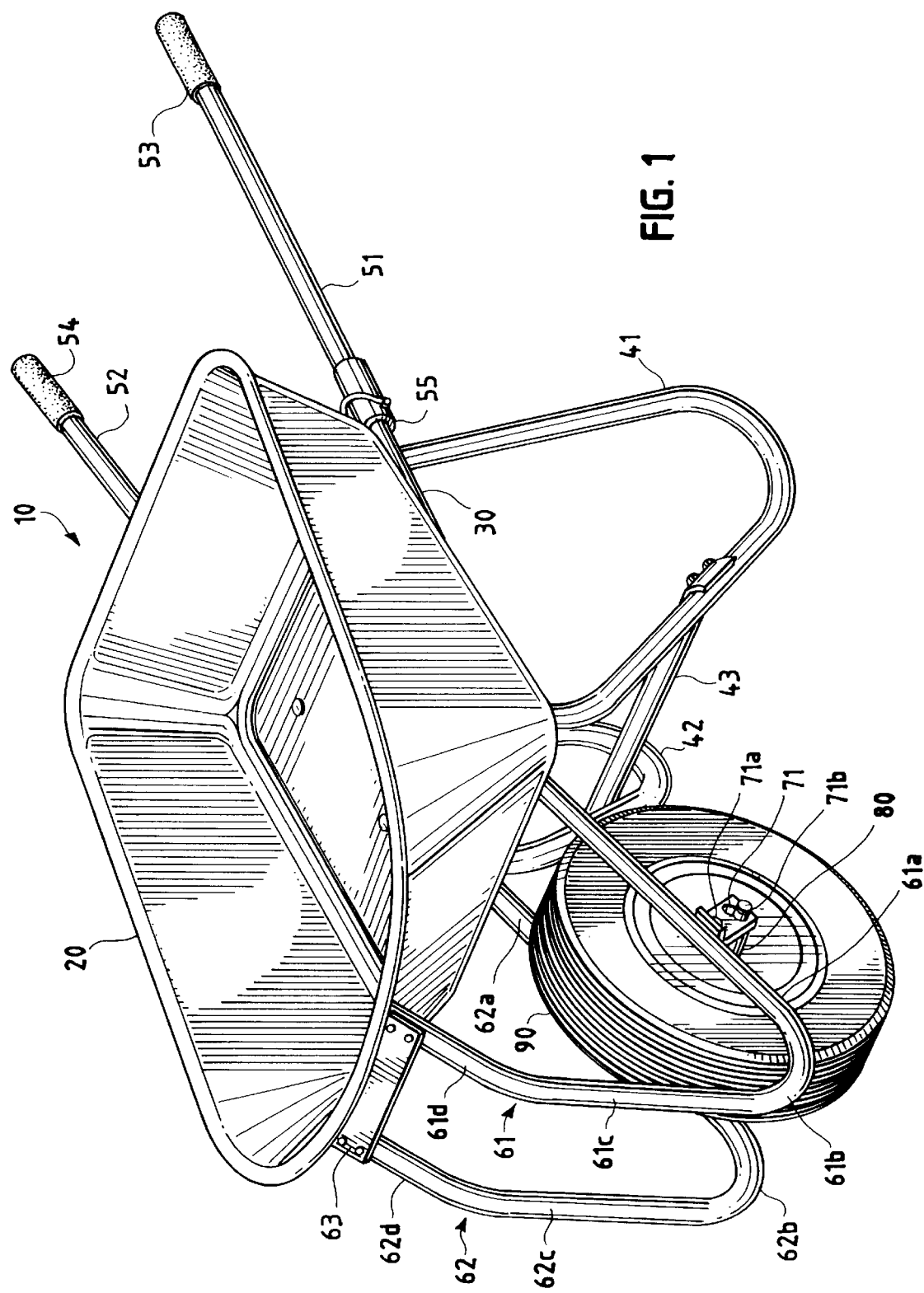
FIG. 1 is a top, front perspective view of the preferred embodiment of the wheelbarrow of this invention.

This invention is best understood by reference to the drawings. Referring to FIGS. 1 to 3, the wheelbarrow 10 contains a tray 20 with a concave upper surface that is adapted for holding solid and liquid loads such as sand, gravel, soil, wet cement, debris, and the like. The tray has a sloped front wall to facilitate dumping, i.e., the front wall forms an angle to the horizontal of about 30° to 75°, preferably about 45° to 60°. The forward edge (the top edge of the front wall) of the tray is preferably outwardly curving when viewed from the top. The outward curve directs the load to a more specific spot when the wheelbarrow is dumped than if the top edge were straight. The side and rear walls of the tray are steeper (more vertical) to maximize volume and their top edges are generally straight.

The size of the tray is a matter of choice, but most commercial wheelbarrows have trays with a volume of about four to five cubic feet. The tray is constructed of a material that is strong enough to hold the intended load without breaking or bending. Suitable materials include steel and plastics such as polyethylene and acrylonitrile-butadiene-styrene copolymers (ABS). As discussed in detail below, the tray does not contact the ground during dumping so no single part of the tray must be strong enough to support the weight of the wheelbarrow and load. Accordingly, the tray can be constructed of steel or plastic that is thinner and/or lighter in weight than the materials typically used for wheelbarrow trays. The preferred tray material is 14 to 18 gage steel.

A frame 30 is attached to the lower surface of the tray. The frame supports the tray and connects to the other major parts of the wheelbarrow. The structure of the frame is not critical. As best seen in FIG. 3, the frame of the preferred embodiment consists of tubes 31 and 32 and plate 33. The tubes are preferably constructed of steel tubing having a wall thickness of about 0.06 inches and an outside diameter of about 1.25 inches. The plate reinforces the bottom of the tray and can be omitted, especially if the tray is constructed of heavier material. The frame is attached to the tray with elevator bolts and nuts.

Legs 41 and 42 depend from the frame and support the wheelbarrow when it is in a horizontal resting position as shown in FIG. 2. In the preferred embodiment, the legs are V-shaped and constructed of the same metal tubing as that used for the frame. The legs are welded to the frame and angle outward so they are in vertical alignment with the sides of the tray to provide a wider and more stable base. A brace 43 is attached to the legs for added stability if desired.

Handles 51 and 52 extend from the frame in a rearward and upward direction. The free ends of the handles are located about two feet above the ground when the wheelbarrow is in the horizontal resting position. This location enables the handles to be lifted a short distance by a normal sized adult standing erect. The handles preferably contain cushioned hand grips 53 and 54 at the free ends. In the preferred embodiment, the handles are constructed of the same metal tubing as that used for the frame and the legs. The preferred embodiment also features handles that are removable for compact storage. Short portions of tubing 55 and 56 extend rearward from the frame. The ends of the handles opposite the grips are expanded internally to form sleeves that slide over the portions extending from the frame. The removable handles are secured in position with clevis pins, nuts and bolts, or the like. Spring clamps (not shown) are conveniently attached to the legs and are used for compactly holding the handles during storage.

The wheelbarrow contains roll bars 61 and 62 that contact the ground and support the wheelbarrow when it is dumped or in a vertical storage position. The roll bars each contain three, and preferably, four sections. The first sections 61a and 62a extend from the frame in a forward and downward direction. The second sections 61b and 62b curve upward. The outward radius of each upwardly curving section is forward of the forward edge of the tray. The third sections 61c and 62c extend vertically in front of the tray. The fourth sections 61d and 62d, which are optional, angle back and connect to the tray with elevator bolts and nuts. An optional brace 63 provides added stability at the point where the roll bars connect to the tray.

In the preferred embodiment, the roll bars are constructed of the same metal tubing as that used for the frame, legs, and handles. The roll bars are parallel and located a distance of about nine inches apart. As discussed in detail below, when the wheelbarrow is tipped, the roll bars are the first part of the wheelbarrow (other than the wheel) to make contact with the ground. As the wheelbarrow is lifted more, the wheel is raised off the ground and the wheelbarrow comes to rest on the vertical sections of the roll bars. To provide sufficient stability, the vertical sections of the roll bars are preferably at least about six inches in length and are most preferably about nine to twelve inches in length.

Axle brackets 71 and 72 are connected to the forward and downwardly extending first sections of the roll bars. Each bracket contains at least one hole or equivalent structure for securing an axle. The axle brackets are positioned along the roll bars so that the wheel axle is located above a horizontal line passing through the lowermost part of the outer radius of the upwardly curving sections of the roll bars. This position of the axle brackets ensures an early contact between the roll bars and the ground when dumping. This position also places the center of gravity of the load over the wheel during transport. In the preferred embodiment, the brackets are steel plates welded to the roll bars in a vertical and parallel orientation. Each bracket contains two holes (71a and 71b, and 72a and 72b). The presence of two pairs of holes enables the user to select the pair that provide the desired properties in the wheelbarrow. Selecting the upper pair of holes (71a and 72a) provides less ground clearance, a lower center of gravity, and an earlier contact between the roll bars and the ground when dumping. Conversely, selecting the lower pair of holes (71b and 72b) provides greater ground clearance, a higher center of gravity, and a later contact between the roll bars and the ground when dumping.

The wheel axle 80 and the wheel 90 are conventional. It is preferred that the wheel axle be secured to the axle brackets with an easily removed mechanism such as a clevis pin. This type of mechanism makes it faster and easier to change the axle to a different pair of holes in the axle bracket. The wheel is preferably pneumatic with an outside diameter of about twelve to eighteen inches.

The use of the wheelbarrow of this invention can now be considered. The wheelbarrow is conventional in terms of its horizontal resting position and the manner in which it is loaded. The wheelbarrow is also moved in a conventional manner with the high maneuverability common to conventional single-wheeled wheelbarrows. As previously discussed, the center of gravity of the load is over the wheel so the force required to lift the handles is minimized. Furthermore, the ability to select from a pair of wheel axle locations enables the user to vary the ground clearance and the height of the center of gravity.

Dumping a load with the wheelbarrow of this invention is surprisingly easy. When the handles are raised through an arc of only about 40°, the outwardly curving sections of the roll bars come into contact with the ground. This point is illustrated in FIG. 4. It can be seen that the handles form an angle to the ground of about 50° at this position whereas the handles form an angle to the ground of about 10° in the horizontal resting position shown in FIG. 2. The difference between these two angles equals the figure of 40°. It can be appreciated that the size the arc is significantly less than 40° if measured from the position in which the handles are held during transportation.

As soon as the roll bars make contact with the ground, the wheelbarrow is stabilized against side-to-side movement and the roll bars become the fulcrum. As this position is reached, the load in the wheelbarrow begins to move forward and to empty. As the load moves and empties, the center of gravity shifts forward which, in turn, facilitates the movement of the wheelbarrow through an even greater arc. The user can continue the dumping operation in an easily controlled manner by applying minimal pushing or restraining force to the handles. The fact that a shifting load facilitates dumping is illustrated by the following observation. When the wheelbarrow is fully loaded with a level volume of sand, it will tilt into the vertical resting position on the vertical extending sections of the roll bars and completely empty the load when the wheelbarrow is released after being raised through an arc of only about 60°. In contrast, the empty wheelbarrow will not tilt into the vertical position until raised through an arc of about 70°.

FIG. 5 illustrates the wheelbarrow in the final dumping/vertical resting position. The vertical resting position is useful for cleaning and for storage. Storing the wheelbarrow in the vertical position reduces the required floor space. Removing the handles further reduces the storage space.

We claim:

1. A wheelbarrow comprising:
   (a) a tray having a concave upper surface for carrying a load, a lower surface, and a forward edge;
   (b) a frame attached to the lower surface of the tray;
   (c) two legs depending from the frame for supporting the wheelbarrow in a horizontal resting position;
   (d) two handles extending from the frame in a rearward and upward direction for handling the wheelbarrow;
   (e) two spaced apart roll bars extending from the frame in a forward and downward direction to a point forward of the forward edge of the tray, then curving upward and extending vertically for a distance of at least about six inches;
   (f) an axle bracket attached to the forward and downward extension of each roll bar, each axle bracket having at least two holes so that the angle at which the upward curve contacts the ground when the wheelbarrow is raised is variable, each hole located above a horizontal line passing through the upward curve of the roll bar;
   (g) a wheel axle removably secured through the holes in the axle brackets; and
   (h) a wheel mounted on the wheel axle; so that the upward curve of the roll bar contacts the ground and forms a fulcrum when the wheelbarrow is raised at an angle of not greater than about 40° and so that the wheelbarrow will balance in a vertical resting position on the vertical extensions of the roll bars if the wheelbarrow is released after being raised at an angle of not greater than about 70°.

2. The wheelbarrow of claim 1 wherein the handles are removable from the frame for storage.

3. The wheelbarrow of claim 2 wherein the forward edge of the tray is outwardly curving.

4. The wheelbarrow of claim 2 wherein the forward edge of the tray is outwardly curving.

5. The wheelbarrow of claim 4 wherein the frame, legs, handles, and roll bars are constructed of steel tubing.

6. The wheelbarrow of claim 3 wherein the frame, legs, handles, and roll bars are constructed of steel tubing.

7. A wheelbarrow comprising:
   (a) a tray having a concave upper surface for carrying a load, a lower surface, and a forward edge;
   (b) a frame attached to the lower surface of the tray;
   (c) two legs depending from the frame for supporting the wheelbarrow in a horizontal resting position;
   (d) two handles extending from the frame in a rearward and upward direction for handling the wheelbarrow;
   (e) two spaced apart roll bars, each having a first section extending from the frame in a forward and downward direction, a second section curving upward from the first section with an outward radius that is forward of the forward edge of the tray, a third section extending vertically from the second section for a distance of at least about six inches, and a fourth section angling back from the third section and connecting to the tray;
   (f) an axle bracket attached to the forward and downward extension of each roll bar, each axle bracket having at least one hole, and each hole located above a horizontal line passing through the upward curve of the roll bar;
   (g) a wheel axle removably secured through the holes in the axle brackets; and
   (h) a wheel mounted on the wheel axle; so that the second sections of the roll bars contact the ground and form a fulcrum when the wheelbarrow is raised at an angle of not greater than about 40° and so that the wheelbarrow will balance in a vertical resting position on the vertical extensions of the roll bars if the wheelbarrow is released after being raised at an angle of not greater than about 70°.

8. The wheelbarrow of claim 7 wherein the axle brackets contain at least two holes so that the angle at which the second sections of the roll bars contact the ground when the wheelbarrow is raised is variable.

9. The wheelbarrow of claim 8 wherein the handles are removable from the frame for storage.

10. A wheelbarrow comprising:
    (a) a tray having a concave upper surface for carrying a load, a lower surface, and a forward edge;
    (b) a frame attached to the lower surface of the tray;
    (c) two legs depending from the frame for supporting the wheelbarrow in a horizontal resting position;
    (d) two handles extending from the frame in a rearward and upward direction for handling the wheelbarrow;
    (e) two spaced apart roll bars extending from the frame in a forward and downward direction to a point forward of the forward edge of the tray, then curving upward and extending vertically for a distance of at least about six inches to form vertical extensions;
    (f) an axle bracket attached to the forward and downward extension of each roll bar, each axle bracket having at least one hole, and each hole located above a horizontal line passing through the upward curve of the roll bar;
    (g) a wheel axle removably secured through the holes in the axle brackets; and
    (h) a wheel mounted on the wheel axle; so that the upward curve of the roll bar contacts the ground and forms a fulcrum when the wheelbarrow is raised at an angle of not greater than about 40° and so that the wheelbarrow will balance in a vertical resting position on the vertical extensions of the roll bars without any part of the tray contacting the ground if the wheelbarrow is released after being raised at an angle of not greater than about 70°.

11. The wheelbarrow of claim 10 wherein the axle brackets contain at least two holes so that the angle at which the upward curve contacts the ground when the wheelbarrow is raised is variable.

12. The wheelbarrow of claim 11 wherein the handles are removable from the frame for storage.

13. The wheelbarrow of claim 12 wherein the forward edge of the tray is outwardly curving.

14. The wheelbarrow of claim 13 wherein the frame, legs, handles, and roll bars are constructed of steel tubing.

* * * * *